Figure 1:
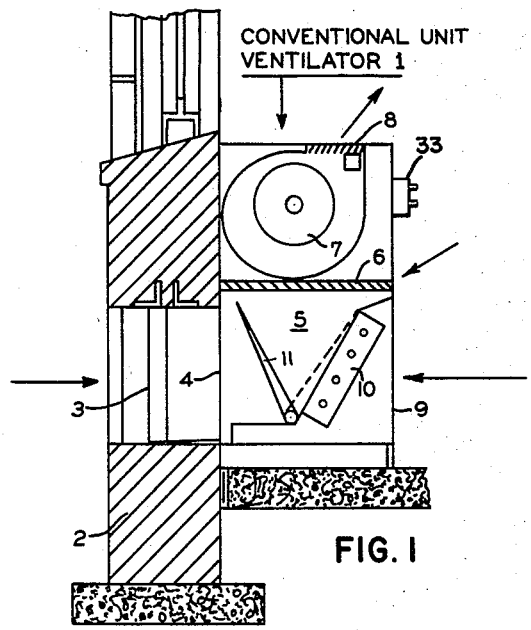

Aug. 23, 1960　　　　F. G. BAKER　　　　2,950,056
UNIT VENTILATOR HAVING CONTROL AND DAMPER CIRCUITS DESIGNED
FOR CONNECTION TO DIFFERENT POWER SUPPLY CIRCUITS
AND A SYSTEM OF SUCH VENTILATORS
Filed Nov. 7, 1956

INVENTOR.
FORREST G. BAKER
BY
ATTORNEY

United States Patent Office 2,950,056
Patented Aug. 23, 1960

2,950,056

UNIT VENTILATOR HAVING CONTROL AND DAMPER CIRCUITS DESIGNED FOR CONNECTION TO DIFFERENT POWER SUPPLY CIRCUITS AND A SYSTEM OF SUCH VENTILATORS

Forrest G. Baker, Davenport, Iowa, assignor to American Air Filter Company, Inc., Moline, Ill., a corporation of Delaware Filed Nov. 7, 1956, Ser. No. 620,953

3 Claims. (Cl. 236—49)

This invention relates to unit ventilators and, more particularly, to a system of unit ventilators for tempering the air in various rooms of an office, school or other buildings.

My copending U.S. application, S.N. 426,770, now United States Patent No. 2,843,324, issued July 15, 1958, discloses a unit ventilator for tempering the air in a given room of a building having first and second electrical power supply circuits such as are normally provided by a three wire system composed of two "hot" line wires and a common ground wire. This unit ventilator comprises:

(1) A fan and day control normally energized by said first electrical power supply circuit with the fan operating continuously to discharge a fan-induced flow of air into the room and the day control operating to signal for more unheated fresh air upon a rise and more reheated room air upon a fall in the temperature of said room from a predetermined value of, say, 72.0° F.;

(2) Motorized damper means arranged for electrical connection one way to said second power supply circuit to increase the relative amount of fresh air and another way to increase the relative amount of room air in said fan-induced flow; and (3) Signal responsive means operating, when the day control is energized, to connect said motorized damper means one way to said second circuit in response to a signal for more fresh air and the other way in response to a signal for more room air, and, when the day control is de-energized, to connect said motorized damper means to said second circuit said other way until the flow of fresh air is closed off.

Where each of a number of offices is provided with a unit ventilator, it is customary to place all of them under a common or central control. Accordingly, a clock-type master control, usually located in the basement or a utility room of the building, is arranged to connect all unit ventilators to the first supply circuit at the beginning of a working day and to disconnect them from the first supply circuit at the close of the working day. Usually when the master control breaks the connection of the fan and day control to the first supply circuit, it cuts in a night control which operates (when some room temperature, such as that of a corridor in the building, falls below a predetermined low "nighttime" value, say 60° F.) to reconnect the fan and day control of all units to the first supply circuit and thereby cause them to operate in the normal manner until the said "corridor" temperature rises above said low "nighttime" value.

While the central control of all unit ventilators has desirable features, it does not accommodate the worker who returns to his office to work at night or during some other "off" interval. The night worker, for example, cannot operate his unit ventilator individually since it is cut off from the first power supply circuit; hence, he must work in his office under relatively cold room temperature conditions unless he resets or otherwise overrides the master control for all units and thereby heats all rooms.

The principal object of this invention is to improve unit ventilator systems of this character to the end that any individual unit ventilator may be independently and normally operated at will during any off interval without requiring any operation of the other unit ventilators involved in the same system.

Another object is to accomplish the foregoing objective in an extremely simple manner involving relatively inexpensive simply operated means.

A further object is to provide a unit ventilator system in which each unit ventilator may be made to operate independently during an off interval simply by pushing or otherwise manually manipulating a simple form of switch.

All of the objectives of my invention may be achieved by arranging a manually operable switch on each unit ventilator for operation from one position, in which it breaks the normal "hot" line connection of the fan and day control to the first power supply circuit, to another position, in which it reconnects the fan and day control to the "hot" line of the second power supply circuit. This new switch may, if desired, be mounted on the unit ventilator cabinet. It should be interposed in the first power supply circuit between the fan and day control of its unit and the master control for all units and arranged to break that connection as it is moved to connect the fan and day control to the second power supply circuit. Obviously my improved arrangement is simple, inexpensive and effective. It has the advantage of enabling any selected unit ventilator to be placed easily and quickly in normal operation at any time during any off interval without requiring any of the unit ventilators of other rooms embraced by the system to be operated at the same time.

Figure 2:
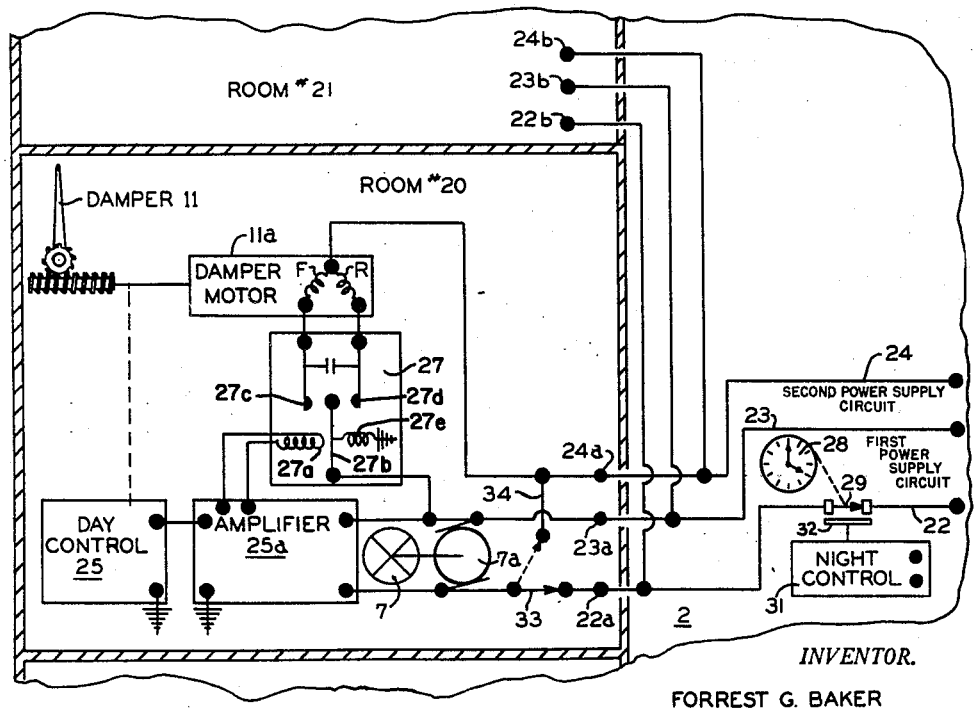

The invention is illustrated in the accompanying drawings wherein:

Fig. 1 schematically illustrates a conventional unit ventilator to which the present invention may be applied; and Fig. 2 is a diagrammatic view of a unit ventilator system embodying the present invention.

Fig. 1 illustrates a conventional unit ventilator, designated 1, which induces unheated fresh air to flow from the outside of a building 2 successively through a building wall inlet 3, a unit ventilator inlet 4, inlet chamber 5, air filter 6, blower 7 and unit ventilator outlet 8 and which induces room air to recirculate from the room through room air inlet 9, heater 10, and the above mentioned parts 5—8 back into the room. The inlet chamber 5 contains a damper 11 mounted for movement from one extreme (full line) room-heating position, in which it closes off the flow of fresh air, to another extreme (dotted line) room-cooling position in which it closes off the flow or recirculation of room air. Between these two extreme positions, the damper controls the relative amounts of heated and unheated air in the fan-induced flow.

Fig. 2 illustrates a unit ventilator system for a building 2 having a unit ventilator in each of several rooms including rooms 20 and 21 and a three wire electrical power supply system composed of "hot" wire 22, ground wire 23 and "hot" wire 24 providing first and second power supply circuits. The system shown is conventional in that it comprises: means connecting wires 22—24 to corresponding terminals 22a—24a in room 20 and 22b—24b in room 21; a blower or fan 7 with drive motor 7a; day control 25 with signal amplifier 25a; motorized damper 11 with motor 11a; signal responsive means 27; a master control 28 in the form of time clock 28 which operates normally closed line switch 29; and a night control 31 which operates a normally open switch 32 bridging the contacts of switch 29.

The Fig. 2 system is conventional insofar as it operates as follows: the motorized fan 7 and day control 25 are normally energized by the first circuit with the motorized fan operating continuously to discharge a fan-induced flow of air into room 20 and the day control 25 operating to signal for more fresh air upon a rise and for more hot air upon a fall in the temperature of said room from a predetermined value of say 72° F.; the motorized damper means 11, 11a is arranged for connection one way through winding F to said second circuit to increase the relative amount of fresh air and another way through winding R to increase the relative amount of room air in said fan-induced flow; the signal responsive means 27, in the form of relay 27a, operates when the day control is energized, to connect said motorized damper 11 one way through winding F to said second circuit in response to a signal for more fresh air and the other way through winding R in response to a signal for more room air, and, when the day control is de-energized, to connect said motorized damper means through said winding R to said second circuit until the flow of fresh air is closed off; the master control 28 operates on a time basis to disconnect the motorized fan 7 and day control 25 from the first circuit during a desired "off" interval by opening hot line 22 through normally closed switch 29; and the night control 31 operates to reconnect the motorized fan 7 and day control 25 to the first circuit during the "off" interval by closing switch 32, which bridges the contacts of switch 29, when the corridor or other room temperature, to which the night control 31 is subject, falls below the low value at which the night control is set. Before passing, it may be noted that the structure and operation of day control 25, 25a and relay 27a are identical to that of the corresponding parts in my aforesaid copending application, now United States Patent 2,843,324. As illustrated and described in more detail therein and as shown in Figure 2 herein, the signal responsive means 27 includes a relay coil 27a, a relay armature member 27b having one end connected to the grounded power line 23 and its free end selectively connectable to either contact 27c to complete the damper opening circuit through motor winding F or to contact 27d to complete the damper closing circuit through motor winding R in response to the state of energization of the relay coil 27a. As also illustrated, a spring 27e forms a yieldable means urging the relay armature member 27b towards the damper closing contact 27d and is of such character that, when unopposed, it is strong enough to pull the armature 27b into contact with said damper closing circuit contact 27d. The relay coil 27a is of such character that when energized, it will urge the armature 27b towards the damper opening circuit contact 27c. Under low room temperature conditions, the signal provided from the day control 25 to the relay coil 27a is of a low strength and such that the magnetic force generated thereby is overcome by the spring member 27e and, as a consequence thereof, the armature 27b will engage and remain in contact with the damper closing circuit contact 27d. Under high room temperature conditions, the signal provided by the day control 25 will be of such greater strength as to energize the relay coil 27a sufficiently to provide a magnetic force that will overcome the action of the spring 27e and will displace the relay armature member 27b into contact with the damper opening circuit contact 27c. Under such conditions the winding F of the damper motor 11a will be energized and the damper 11 will be moved in such a direction as to increase the amount of fresh air being introduced into the room.

By the above described construction will be seen that when the signal from the day control 25 is below a predetermined value or is non-existent, as would be occasioned by the complete de-energization of the day control 25 through opening of the switch 29 by the master control 28, the spring 27e will urge the armature 27b into the contact with the damper closing circuit contact 27d and as such will result in energization of the winding R of damper motor 11a in such manner as to displace the damper 11 into fresh air inlet closing position. A suitable limit switch may be provided, as described in my above mentioned patent, to reopen the circuit through the winding R when said damper reaches its limiting position closing the fresh air inlet.

With the time clock 28 set to energize the day control at 7:00 a.m. and de-energize it at 5:00 p.m., it will be appreciated that, during colder weather, the room temperature of each room will begin to drop at 5:00 p.m. despite the fact that the damper moves to close off the fresh air inlet when its unit ventilator is shut down. With the night control set to maintain a lower temperature of say 60° F., the temperature in different rooms may vary, some being above and other below 60° F. As a consequence, the night worker is compelled to work in a relatively cold room unless he resets the time clock 28 to place all unit ventilators in the system back into operation. This is not only a nuisance but results in a waste of heat.

After considering the objections of the conventional arrangements, I finally realized that they could be entirely overcome and that the unit ventilator in any given room could be restored to normal operation during any "off" time simply by connecting the motorized fan and day control in the given room across the second power supply circuit in that same room because the second power supply circuit remains available as an uninterrupted source of power in all rooms at all times.

In accordance with my invention, therefore, a manually operated switch 33 is provided and normally connected serially in the first circuit hot line 22 between the clock-controlled switch 29 and the unit ventilator itself. This transfer switch is arranged for movement from its normal position, in which it operates as a series switch in the first power supply circuit, to another position, in which it disconnects the unit ventilator from the first power supply circuit and reconnects it through line 34 to hot line 24 of the second power supply circuit thereby placing the fan and day control of that particular unit ventilator across the second circuit. When this is done in room 20, for example, the unit ventilator of room 20 is thereby placed in normal operation to bring the temperature of room 20 up to and hold it at 72° so long as that condition may be desired. Furthermore, this desirable result is accomplished without interfering with the control automatically exercised by the night controls over the unit ventilators in the other rooms. When the night worker leaves, he need only operate the transfer switch 33 back to its first circuit position to place the unit ventilator of room 20 once again under automatic night control.

Having described my invention, I claim:

1. An apparatus for tempering air in a building having first and second electrical power supply circuits, comprising: a unit ventilator having motorized-fan and day control designed normally to be connected to and energized by said first circuit with the motorized fan operating continuously to discharge a fan-induced flow of air into the room and the day control operating to signal for more fresh air upon a rise and for more hot air upon a fall in the temperature of said room from a predetermined value, motorized damper means arranged for selective connection one way to said second circuit to displace a damper in a direction to increase the relative amount of fresh air and another way to displace said damper in a direction to increase the relative amount of room air in said fan-induced flow and signal responsive means operating, when the day control is energized, to selectively connect said motorized damper means said one way to said second circuit in response to a signal for more fresh air and said other way in response to a signal for more room air; said signal responsive means including means to connect said motorized damper means to said second circuit in said other way in response to de-energization of said day control to displace said damper to a limiting position wherein the fresh air content of said fan induced flow of air is reduced to substantially zero and a transfer switch operable at will for transferring the connection of the fan and day control from the first power supply circuit to the second power supply circuit.

2. The apparatus of claim 1 wherein: said transfer switch is mounted on the unit ventilator.

3. A construction for electrically powered room air tempering apparatus installable in individual rooms in buildings having first and second electrical power supply circuits therefor and a selectively operable master night control for deenergizing the first of said circuits and all individual room air tempering apparatus connected thereto, comprising motor operated blower means for inducing a flow of air from a fresh air inlet opening and a recirculating air inlet opening through an outlet opening selectively connectable to said first or second electrical power supply circuits, damper means displaceable intermediate said fresh and recirculating air inlet openings for proportioning the relative amounts of fresh and recirculated air passing therethrough, temperature sensing means for providing electrical signals indicative of a departure of room air temperature from a predetermined desired value thereof selectively connectable to said first or second electrical power supply circuits, means arranged to be powered from said second electrical circuit and responsive to said electrical signals for displacing said damper means in a direction to return said room air temperature to said predetermined desired value thereof, said last mentioned means including means for effecting displacement of said damper to fresh air inlet closing position whenever said temperature sensing means is de-energized by de-energization of said first circuit by said master night control and manually operable switching means for effecting the selected connection of said temperature sensing means and said motor operated blower means to said first electrical power supply circuit to permit operation of said apparatus subject to said master control and to said second electrical power supply circuit to permit operation of said apparatus independent of said master control.

References Cited in the file of this patent

UNITED STATES PATENTS

| | | |
|---|---|---|
| 1,720,723 | Dodge | July 16, 1929 |
| 1,796,766 | Preis | Mar. 17, 1931 |
| 1,985,986 | Hall | Jan. 1, 1935 |
| 2,177,496 | Miller et al. | Oct. 24, 1939 |
| 2,227,359 | Metzger et al. | Dec. 21, 1940 |
| 2,269,280 | McGrath | Jan. 6, 1942 |
| 2,572,136 | Greenlee | Oct. 23, 1951 |
| 2,711,681 | Levine | June 28, 1955 |